(12) United States Patent
Reeves et al.

(10) Patent No.: US 8,683,063 B1
(45) Date of Patent: Mar. 25, 2014

(54) REGULATING INTERNET TRAFFIC THAT IS COMMUNICATED THROUGH ANONYMIZING GATEWAYS

(75) Inventors: Raymond Emilio Reeves, Olathe, KS (US); Prabhat Karki, Olathe, KS (US); Wen Xue, Overland Park, KS (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 1096 days.

(21) Appl. No.: 12/691,499

(22) Filed: Jan. 21, 2010

(51) Int. Cl.
*G06F 15/16* (2006.01)

(52) U.S. Cl.
USPC .............................. 709/229; 709/224; 726/12

(58) Field of Classification Search
None
See application file for complete search history.

(56) References Cited

U.S. PATENT DOCUMENTS

| | | | |
|---|---|---|---|
| 8,230,506 B1* | 7/2012 | Forristal | 726/23 |
| 2005/0259667 A1* | 11/2005 | Vinokurov et al. | 370/401 |
| 2008/0104688 A1* | 5/2008 | Paskett et al. | 726/12 |
| 2009/0157675 A1* | 6/2009 | Stellhorn et al. | 707/6 |
| 2010/0205291 A1* | 8/2010 | Baldry et al. | 709/224 |

* cited by examiner

*Primary Examiner* — Mohamed Ibrahim (57) ABSTRACT

A medium and method are provided for preventing undesired data from being communicated through a network. In one aspect, the method comprises receiving from an anonymizing device an indication of an undesired data communication and an identification of one or more of a computing device responsible for said communication and a user responsible for said communication; on the basis of specified criteria, determining whether said indication is valid; when said indication is valid, incrementing a cumulative instance count that sums a number of instances associated with one or more of the computing device and the user; and, when said cumulative count exceeds a predetermined threshold number of instances, implementing a measure to prevent a further undesired data communication from said computing device.

20 Claims, 6 Drawing Sheets

REGULATING INTERNET TRAFFIC THAT IS COMMUNICATED THROUGH ANONYMIZING GATEWAYS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways of preventing abusive behavior from behind anonymizing gateways without blocking all traffic passing through that gateway. Individual devices or users can be blocked even though their identities are not known to the nodes receiving the abusive behavior.

In a first aspect, a set of embodied computer-useable instructions facilitate a centralized abuse prevention node receiving and aggregating notifications of undesired communications together with the responsible node and/or user via one or more anonymizing gateways from those nodes receiving the undesired communications. Instructions for rewriting these indications for forwarding to the responsible node and/or user may be returned to the anonymizing gateway. If enough of these notifications are received for a single node or user, measures are taken to prevent further unwanted communication by that node or user.

In a second aspect, a set of embodied computer-useable instructions facilitate an anonymizing gateway receiving a notification of abusive behavior from a content provider on the Internet and determining the user and/or device responsible for the reported behavior. The notification and identification are then sent together to a node responsible for collecting such notifications, which may then reply with instructions for rewriting the notification and forwarding it to the device for display to the user.

In a third aspect, a set of computer-useable instructions facilitate a content provider which has received an unwanted communication via an anonymizing gateway to notify that anonymizing gateway of the unwanted nature of the communications so the anonymizing gateway can take measures to prevent further abusive communications by the responsible node and/or user as an alternative to having all traffic it forwards be blocked by the content provider.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AD Anonymizing Device
APC Abuse Prevention Component
ARQ Abusive Request Notification
CP Content Provider
ESN Electronic Serial Number
HTTP HyperText Transport Protocol
IP Internet Protocol
MAC Medium Access Control
NAT Network Address Translation
TCP Transmission Control Protocol
VoIP Voice over Internet Protocol Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
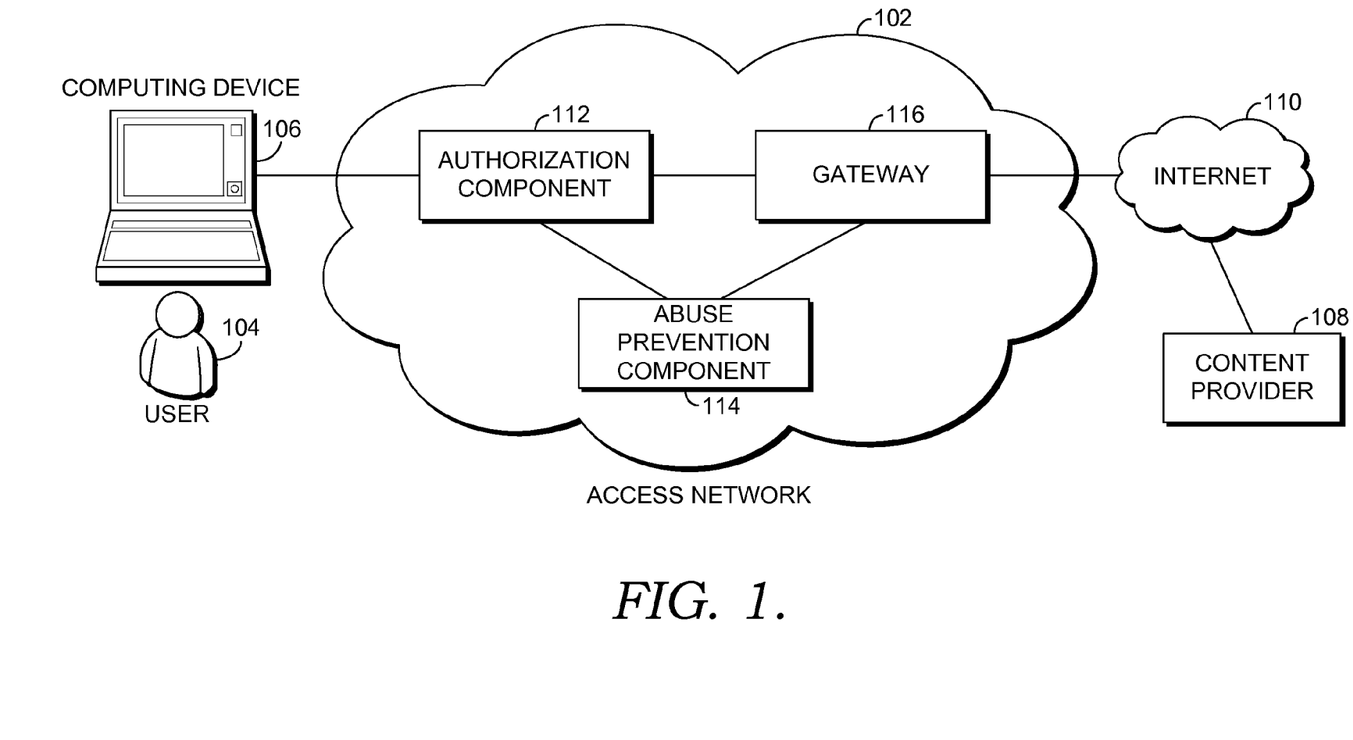
FIGS. 1-3 are block diagrams of three exemplary systems (increasing in complexity) in accordance with various embodiments of the present invention.

Turning now to FIG. 1, a simple block diagram of an exemplary system in accordance with one embodiment of the present invention is provided. Although some components are shown in the singular, they may be plural. For example, an access network 102 might include multiple gateways or authorization components. As illustratively shown, a user 104 associated with a computing device 106 is connected to a content provider 108 via access network 102 and the Internet 110. In operation, user 104 uses computing device 106 to communicate with content provider 108. Computing device 106 can take the form of a smartphone, laptop computer, desktop computer or other IP-enabled device.

Access network 102 is a network controlled by a single administrative entity, comprised of one or more components including an authorization component 112, an abuse prevention component 114 and a gateway 116; other components (not shown) include all of the infrastructure necessary to allow user device 106 to connect to Internet 110. Though these components are shown as separate in this embodiment, one or more may be combined into a single unit. Illustrative examples of access networks include a wireless telecommunication environment and an Internet Service Provider network.

In one embodiment, authorization component 112 is a computer executing a set of computer-executable instructions for determining whether user device 106 is permitted to use access network 102 to connect to Internet 110. In one embodiment, this determination is performed based on authentication information provided by user 104. In another embodiment, authorization component 112 is a server process comprising a set of computer-executable instructions for determining whether user device 106 is permitted to use access network 102 to connect to Internet 110.

In one embodiment, abuse prevention component 114 is a computer executing a set of computer-executable instructions for collecting and aggregating all notifications of unwanted communication originating from devices, such as user device 106, using access network 102 to connect to content providers such as content provider 108. In another embodiment, abuse prevention component 114 is a server process comprising a set of computer-executable instructions for collecting and aggregating all notifications of unwanted communication originating from devices, such as user device 106, using access network 102 to connect to content providers such as content provider 108.

In one embodiment, gateway 116 is a computer executing a set of computer executable instructions and serves as the point of connection of access network 102 to Internet 110; in the illustrated embodiment, all traffic originating from user device 106 destined for content provider 108 passes through gateway 116. In another embodiment, gateway 116 is a server process comprising a set of computer executable instructions and serves as the point of connection of access network 102 to Internet 110. In one embodiment, gateway 116 serves to effectively hide the identity of user device 106 from content provider 108 by acting as a Network Address Translation (NAT) device.

In one embodiment, content provider 108 is a computer executing a set of computer executable instructions and is connected to Internet 110, with which user 104 wishes to communicate. Content provided by content provider 108 may include web pages, email services, Voice-over-Internet-Protocol (VoIP) telephony, streaming video, and other IP data services. In another embodiment, content provider 108 is a server process comprising a set of computer executable instructions and is connected to Internet 110, with which user 104 wishes to communicate.

Figure 2:
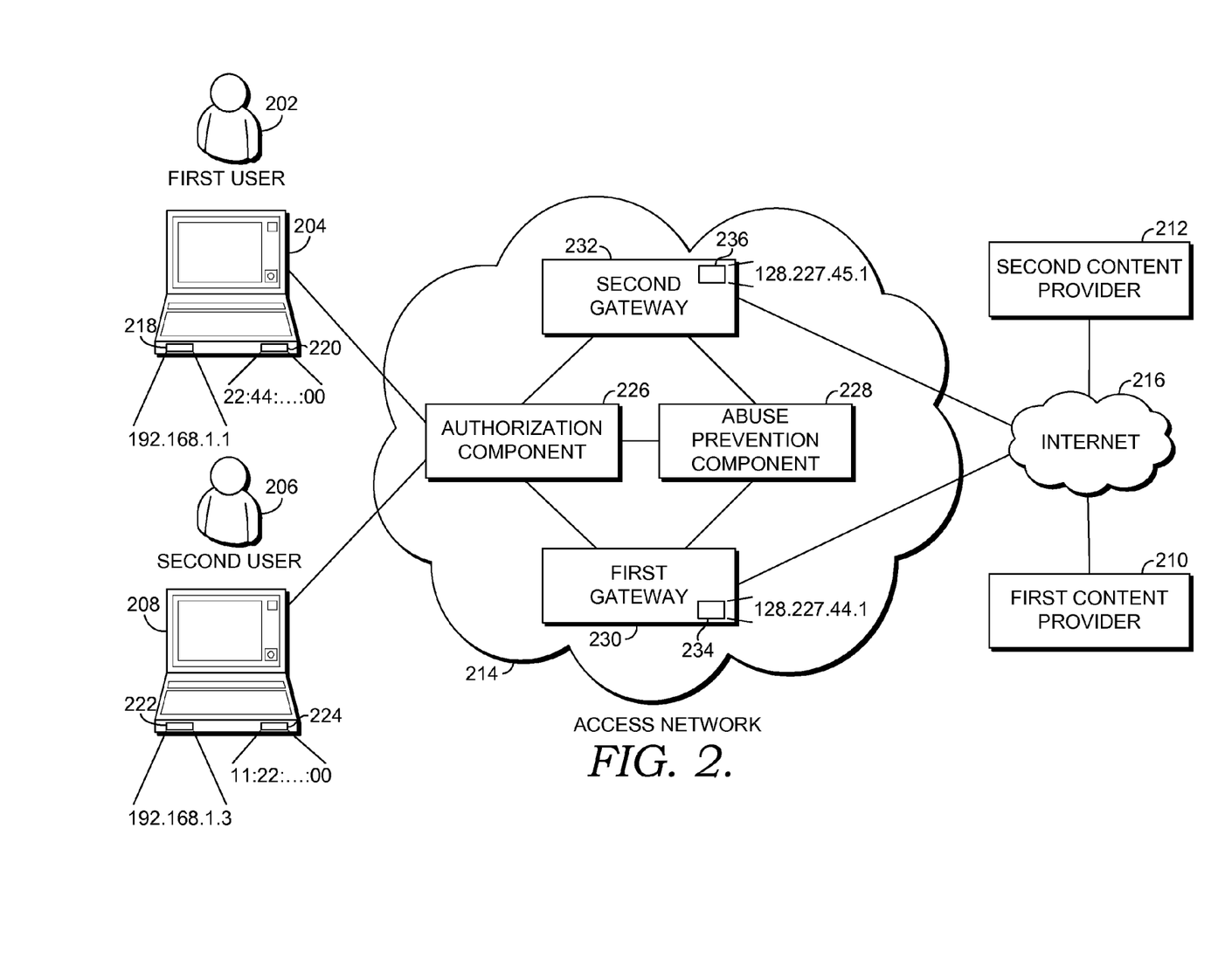

Turning now to FIG. 2, a block diagram of an exemplary system in accordance with a more complex embodiment of the present invention is provided. In this embodiment, a first user 202 associated with a device 204 and a second user 206 associated with a device 208 are connected to a first content provider 210 and second content provider 212 via the access network 214 and the Internet 216. Device 204 may have, in addition to internal IP address 218, a durable device identifier 220, and similarly, device 208 may have, in addition to internal IP address 222, a durable device identifier 224. As shown, internal IP address 218 and internal IP address 222 may be nonroutable IP addresses requiring that first gateway 230 and second gateway 232 perform NAT. Illustrative durable device identifiers may take the form of a Medium Access Control (MAC) address or an Electronic Serial Number (ESN).

In this figure, certain components are similar in nature to those described in FIG. 1. First user 202 and second user 206 correspond to user 104. Device 204 and Device 208 correspond to computing device 106. Access network 214, authorization component 226, and abuse prevention component 228 correspond to access network 102, authorization component 112, and abuse prevention component 114. First gateway 230 and second gateway 232 correspond to gateway 116; in this illustrative embodiment, some traffic originating from user device 204 and user device 208 may travel via first gateway 230 and some may travel via second gateway 232. Internet 216 corresponds to Internet 110, and first content provider 210 and second content provider 212 correspond to content provider 108.

In this embodiment, the determination by authorization component 226 as to whether device 204 is permitted to use access network 214 to access Internet 216 can also be made on the basis of durable device identifier 220; similarly, the determination of whether device 208 is permitted to use access network 214 to access Internet 216 can be made on the basis of durable device identifier 224. Furthermore, internal IP address 218 may be assigned on the basis of durable device identifier 220, and internal IP address 222 may be assigned on the basis of durable device identifier 224 for ease in mapping traffic to a device.

Also in this embodiment, access network 214 has, in addition to authorization component 226 and abuse prevention component 228, a first gateway 230 and a second gateway 232, which act as anonymizing devices (ADs) for access network 214. Thus traffic from device 204 and traffic from device 208 may both appear to first content provider 210 to originate from the IP address 234 of first gateway 230, even though device 204 has internal IP address 218 which differs from internal IP address 222 of device 208. Similarly, traffic from device 204 may appear at times to come from IP address 234 of first gateway 230 and at times from the IP address 236 of second gateway 232. In one embodiment, the determination of whether to use first gateway 230 or second gateway 232 is made at the time device 204 is authorized by authorization component 226 to use access network 214. In another embodiment, that determination is made on a per-request basis by access network 214.

Figure 3:
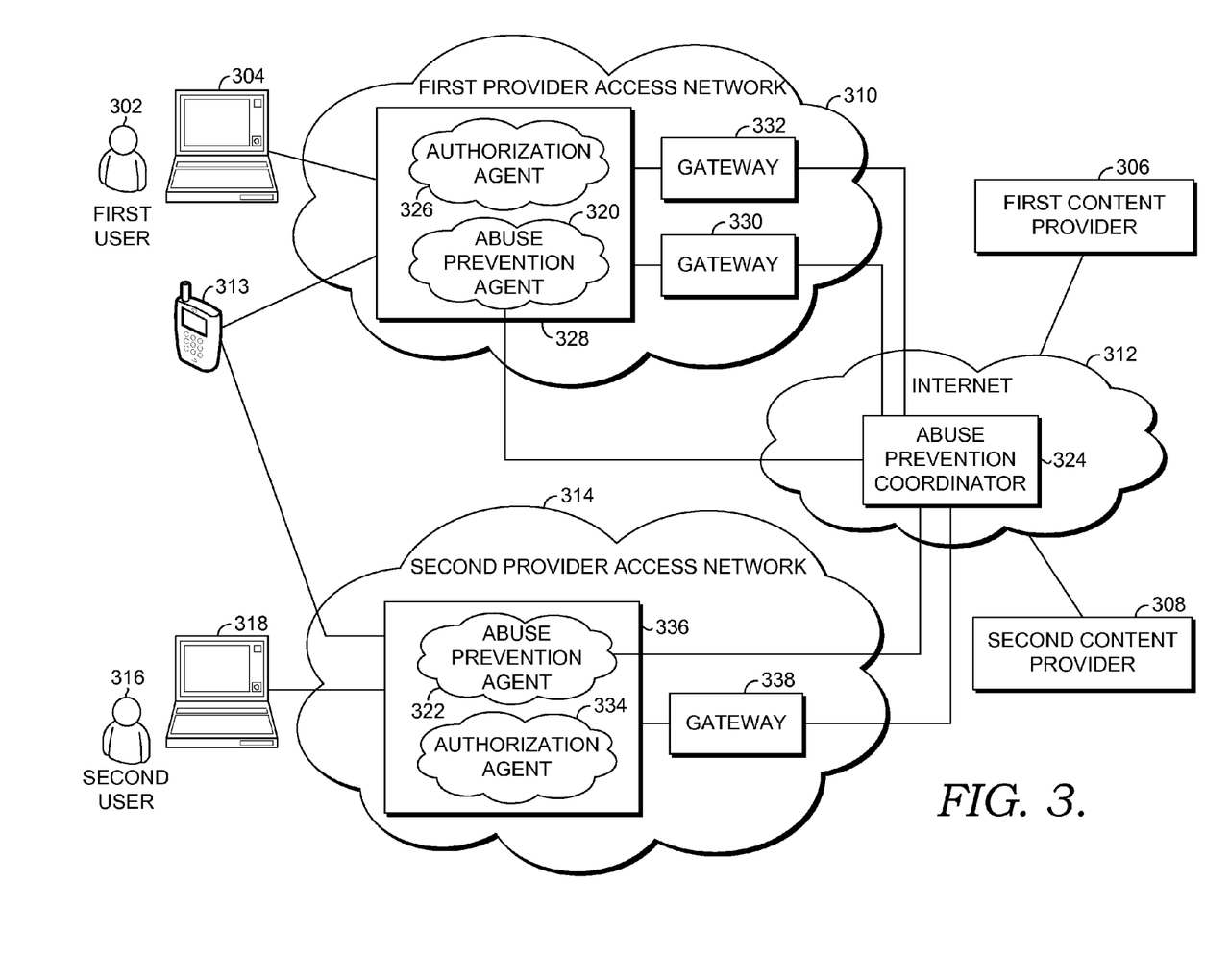

Turning now to FIG. 3, a block diagram of an exemplary system in accordance with a still more complex embodiment of the present invention is provided. In this embodiment, a first user 302 has a first device 304 which can access a first content provider 306 or a second content provider 308 via a first provider access network 310 and the Internet 312 and a second device 313 which can access content providers 306 and 308 via the Internet 312 and either first provider access network 310 or second provider access network 314. Second user 316 has a device 318 which can access content providers 306 and 308 via second access network 314 and the Internet 312.

Several components of FIG. 3 correspond to those in FIG. 1. First user 302 and second user 316 correspond to user 104. Device 304 and device 318 both correspond to device 106. Device 313 also corresponds to device 106, save that it can connect to Internet 312 either via first provider access network 310 or via second provider access network 314. In one embodiment, the determination of which access network to use is made explicitly by the user. In another embodiment, the determination may be made by the device based on the availability of each access network or other factors. Internet 312 corresponds to Internet 110, and both first content provider 306 and second content provider 308 correspond to content provider 108. Both first provider access network 310 and second provider access network 314 correspond to access network 102, though their components are arranged differently as described below.

In this embodiment, access networks 310 and 314 have, instead of discrete abuse prevention components, abuse prevention agents 320 and 322 respectively, which communicate with abuse prevention coordinator 324 via the Internet 312. In this fashion, the functionality of abuse prevention component 114 for first provider access network 310 is split between abuse prevention agent 320 and abuse prevention coordinator 324; similarly, the functionality of abuse prevention component 114 for second provider access network 314 is split between abuse prevention agent 322 and abuse prevention coordinator 324. In this embodiment, notifications of unwanted communication by device 313 can be stored on abuse prevention coordinator 324 and accessed by abuse prevention agent 322 and abuse prevention agent 320, regardless of whether the unwanted communication was sent via first provider access network 310 or second provider access network 314.

In this embodiment, access network 310 has combined the authorization agent 326 and the abuse prevention agent 320 into a single unit 328 while gateways 330 and 332 remain separate; similarly, access network 314 has combined authorization agent 334 and abuse prevention agent 322 into a single unit 336 while gateway 338 remains separate. In one embodiment, this is accomplished by running the computer-executable instructions for authorization and the computer-executable instructions as separate processes on component 328 and component 336. In another embodiment, this is accomplished by running a single set of computer-executable instructions which perform both sets of functionality as a single process on component 328 and component 336.

As in the embodiment of FIG. 2, traffic from device 304 of user 302 may appear to first content provider 306 to be coming from either gateway 330 or gateway 332; however, in this embodiment, traffic from device 313 of user 302 may appear to first content provider 306 to be coming from gateway 338 in addition to gateways 330 and 332. Thus, device 313 remains able to connect to first content provider 306 even if all connections from first provider access network 310 are disallowed.

Figure 4:
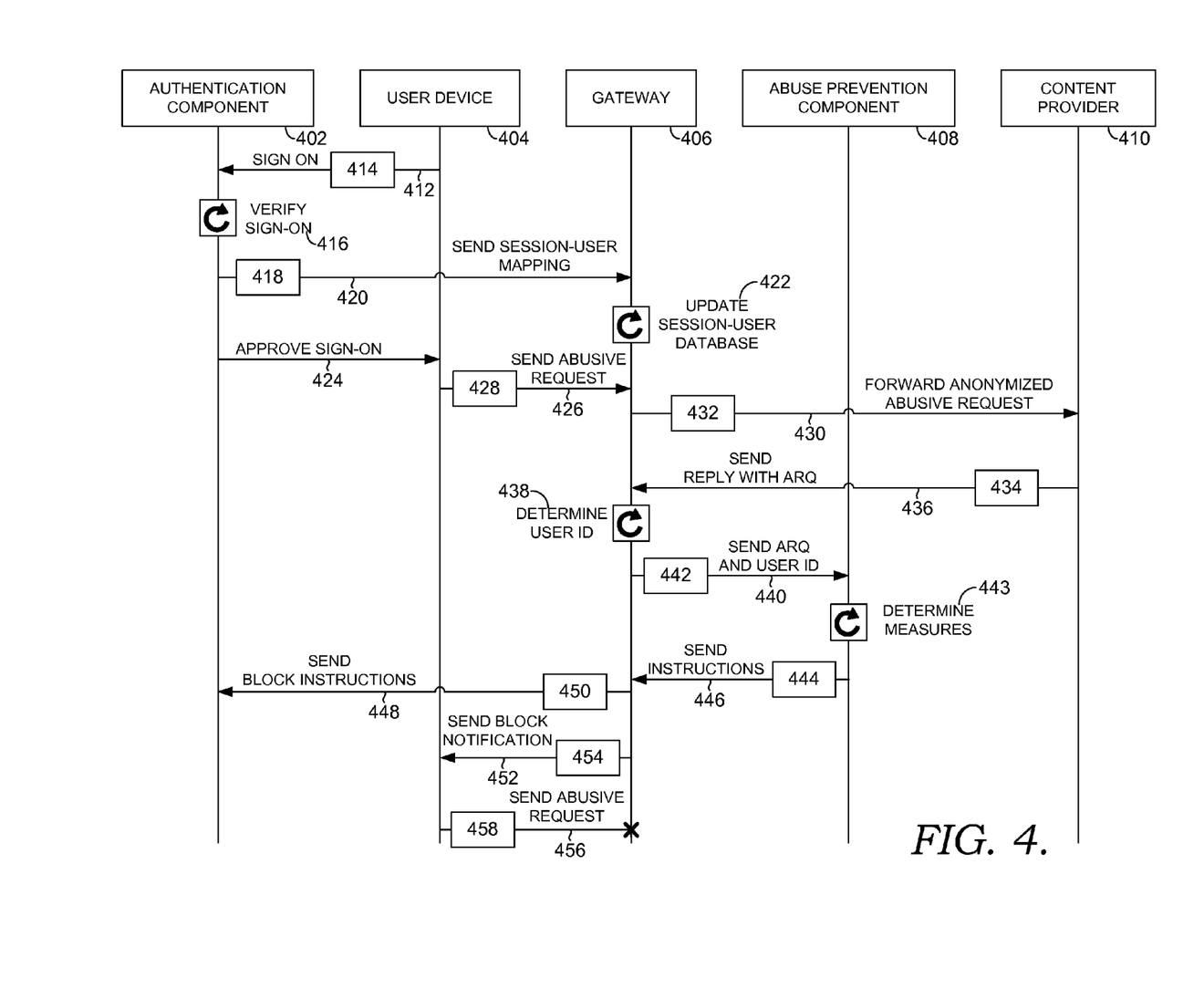
FIG. 4 depicts an illustrative data flow that shows data flowing in accordance with an embodiment of the present invention.

Turning now to FIG. 4, an illustrative data flow diagram is provided for an authentication component 402, a user device 404, a gateway 406, an abuse prevention component 408, and a content provider 410. At step 412, user device 404 sends a sign-on message 414 to the authentication component. As an illustrative example, sign-on message 414 may contain information such as a username and password for a user 104, a durable device identifier 220, or another method of confirming that device 404 is authorized to access content provider 410 via gateway 406. Once authentication component 402 has verified the sign-on message in step 416, it sends a session-user mapping 418 to gateway 406 in step 420. This message contains any information necessary to determine a user 104 or durable device identifier 220 from a temporary session identifier such as an internal IP address 218. As an illustrative example, the session-user mapping may include a durable device identifier 220 and the internal IP address 218 for device 404. In this embodiment, gateway 406 stores mapping 418 in a database of such mappings in step 422. In another embodiment, another form of storage such as a lookup table may be used to store mapping 418. Next, in step 424, authentication component 402 approves sign-on message 414 of user device 404. In another embodiment, step 424 may occur before or simultaneously with step 420.

At this point, user device 404 can now access content provider 410 via gateway 406, and a number of innocuous communications (not shown) may take place. At step 426, user device sends an abusive or undesired communication 428 to content provider 410. This undesired communication may take a variety of forms without departing from the scope of the claims below. By way of example, the communication could be sent by way of HTTP, FTP or SMTP; the undesired nature of the communication may be the communication itself, attempting to access a forbidden resource, making an excessive number of connection attempts, or otherwise violating content provider policies. In step 430, gateway 406 rewrites this request to replace internal device IP address 218 with the IP address 234 of gateway 406 according to standard NAT procedure, and forwards the rewritten request 432 to content provider 410.

Upon receiving abusive request 432, content provider 410 determines that IP address 234 corresponds to an anonymizing device (i.e. gateway 406). In one embodiment, this determination is performed by consulting a known list of anonymizing devices. In another embodiment, a header may be inserted into the rewritten abusive request 432 by gateway 406 indicating that it was sent via an anonymizing device. Content provider 410 then sends a reply 434 including an Abusive Request (ARQ) notification in step 436. In one embodiment, the ARQ notification includes an expiration time after which it is no longer valid and should be discarded. In a variation of this embodiment, content provider 410 may include an expiration time in the past to display a warning on user device 404 that communication 428 is unwanted but to indicate to abuse prevention component 408 that no measures should be taken. In step 438, Gateway 406 receives reply 434 and retrieves session-user mapping 418 from the database.

In step 440, gateway 406 sends a message 442 including ARQ 434 and session-user mapping 418 to abuse prevention component 408. Based on a predetermined policy, abuse prevention component 408 determines measures to be taken in step 443 and responds to gateway 406 with instructions 444 in step 446. The measures taken and the instructions for gateway 406 may take a variety of forms without departing from the scope of the claims below. As an illustrative example, these instructions may include rewriting reply 434 and forwarding it to user device 404, notifying authentication component 402 to block further sign-on requests from user device 404, or blocking further communication by user device 404 via gateway 406. In this example, multiple actions are taken: in step 448, block instructions 450 are sent to authentication component 402, and in step 452, a response 454 including a block notification is sent to user device 404. Finally, in step 456, user device 404 sends a further request 458 to gateway 406, which is blocked in accordance with instructions 444.

Figure 5:
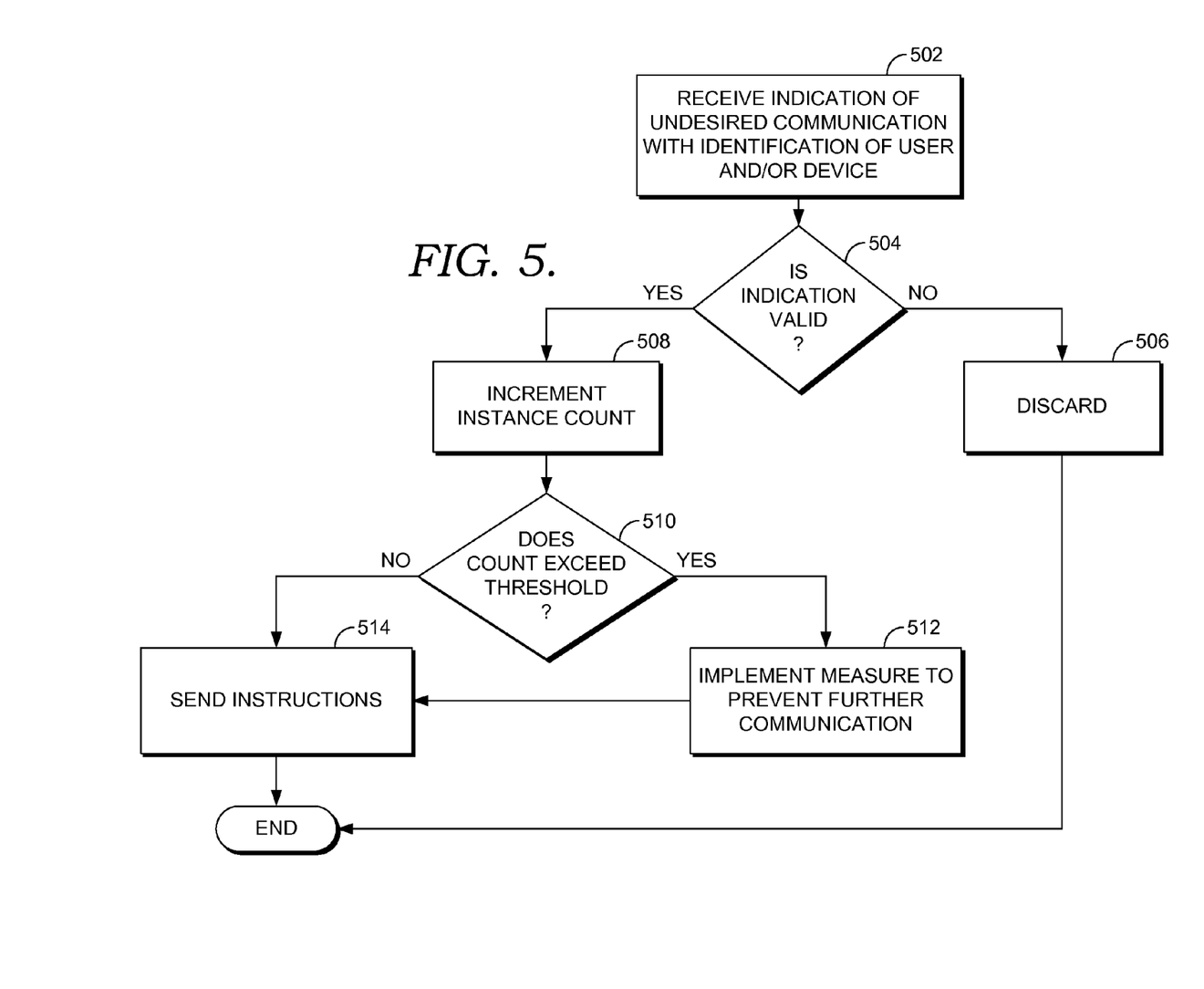
FIG. 5 depicts a flow diagram of an exemplary method operating at an abuse prevention node in accordance with one embodiment of the present invention.

FIG. 5 presents an illustrative method as a part of a system for preventing undesired data from being communicated through a network. As an illustrative example, this method could be implemented at an abuse prevention component or an abuse prevention coordinator. At step 502, a message 442 is received which includes an indication of unwanted communication (i.e., an ARQ notification) and an identification of the user and/or device responsible. In one embodiment, this indication is received from an anonymizing gateway 116, which received the indication from a content provider 108 and determined the user 104 and/or device 106 responsible.

At step 504, a determination is made as to whether the indication is valid; if it is not, it is discarded at step 506. This determination can be made on the basis of a variety of factors; by way of example, factors to be considered in determining ARQ notification validity include whether an agreement exists with the originating content provider to mitigate undesired communications, whether the expiration time, if any, included in the ARQ notification has passed, the number of ARQ notifications previously received from the originating content provider, the number of valid ARQ notifications previously received identifying the same user, and the number of valid ARQ notifications previously received from the originating content provider identifying the same user. Other factors can be considered without departing from the scope of the claims below.

Otherwise, if the indication is valid, at step 508 an instance count associated with the user and/or device is incremented. In one embodiment, as shown in FIG. 2, this instance count is kept separately for each access network. In another embodiment, as shown in FIG. 3, this instance count can be aggregated across all access networks. In an illustrative example of the latter case, abuse prevention agent 322 forwards a copy of the valid ARQ 442 it receives to abuse prevention coordinator 324, which performs step 508 and responds to the abuse prevention agent 322 with the current value of the instance count, which it then uses for step 510. In other embodiments, steps may be performed by different components without departing from the scope of the claims below.

Note that in various embodiments, ARQ notifications may be grouped into instance counts in different ways. Consider FIG. 3 for illustrative purposes: in one embodiment, ARQ notifications may be grouped separately for each different combination of user (user 302 or user 316), device (device 304, device 313, or device 318), access network (first provider network 310 or second provider access network 314), and content provider (content provider 306 or second content provider 308). In another embodiment, ARQ notifications may be grouped based solely on device, so that an undesired communication from user 302 using device 313 via access network 310 to content provider 306 is included in the same instance count as an undesired communication from user 302 using device 313 via access network 314 to access content provider 308. In another embodiment, ARQs may be counted on a per-user basis rather than a per-device basis; thus an unwanted communication from user 302 using device 304 to access content provider 306 via access network 310 is included in the same instance count as an unwanted communication from user 302 using device 313 to access content provider 308. Other ways of grouping ARQ notifications are possible without departing from the scope of the claims below.

Next, at step 510, the instance count is compared to a threshold. In one embodiment, this threshold is the same for all users and content providers for a given access network. In another embodiment, a threshold for content provider 212 may be determined by contractual agreement with content provider 212, while a threshold for content provider 210 is determined to be a default value where no contract exists. In yet another embodiment, the threshold may be lower for a user who has previously been determined to be responsible for unwanted communications. Other methods of determining a threshold in different scenarios are possible without departing from the scope of the claims below.

If the instance count exceeds the threshold, measures are implemented to prevent further abusive behavior by the user and/or device responsible at step 512. A wide variety of measures to be taken are possible without departing from the scope of the claims below. In an illustrative example, one measure might temporarily block user 202 from accessing the HTTP service of content provider 210 using device 204 via access network 214. Repeated or more severe abusive behavior might call for a measure which permanently blocks user 202 from accessing any data service of any content provider using any device via any access network.

Note that the determination of which, if any, measures are to be taken can depend on multiple groupings of ARQ notifications as described above. In an illustrative example, a given measure might be taken upon receipt of five ARQ notifications from a single content provider or at least one ARQ notification from each of three distinct content providers. The number of ARQ notifications required to trigger a given measure may also depend on the content provider originating them; for example, five ARQ notifications from one content might be required to trigger the same measure triggered by three notifications from a different content provider even if the abusive behavior was identical.

At step 514, instructions for rewriting the indication into a form suitable for presentation to the responsible user 202 are sent to the gateway 230. These rewriting instructions can take on a variety of forms without departing from the scope of the claims below. In an illustrative example, if device 204 is determined to be capable of interpreting it correctly, the instructions indicate that ARQ 434 is to be forwarded to device 204 unchanged for display to user 202. In another embodiment, where content provider 210 provides requested content with the ARQ 434 at step 436, the instructions indicate that a warning or block notification is to be inserted into the text of the requested content for display to user 202. In yet another embodiment, the instructions indicate that ARQ 434 is to be removed and requested content 434 is to be returned to user 202 unchanged so as not to alert user 202 that abusive behavior is being tracked. In one embodiment, the instructions 444 take the form of a numerical code indicating the action to take. In another embodiment, any requested content 434 provided by content provider 410 at step 436 is forwarded to the abuse prevention component 408, which performs the rewriting itself and returns the rewritten reply 444 to gateway 406 at step 446.

Figure 6:
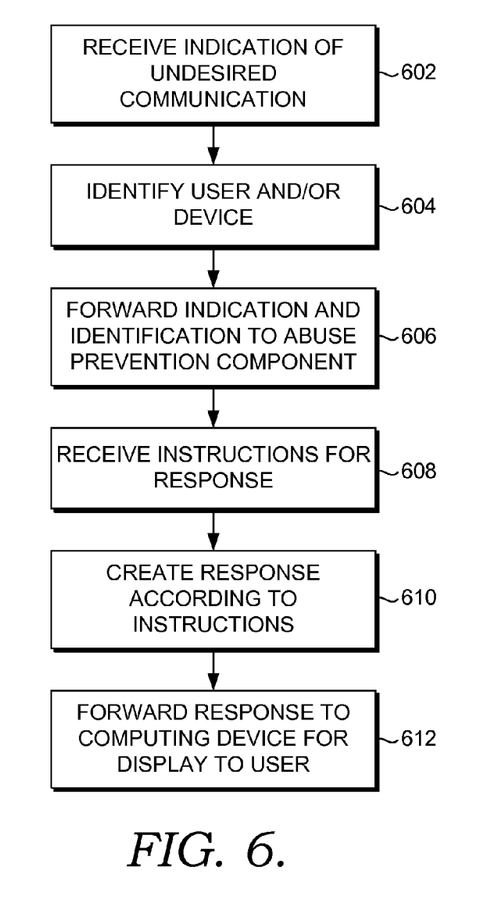
FIG. 6 depicts a flow diagram of an exemplary method operating at an anonymizing device in accordance with one embodiment of the present invention.

FIG. 6 presents an illustrative method as a part of a system for preventing undesired data from being communicated through a network. As an illustrative example, this method could be implemented at an anonymizing device. At step 602, an indication of unwanted communication (i.e., ARQ notification) 434 is received. As an illustrative example, this indication might originate from a content provider 210 or from an Internet provider on the path of the unwanted communication. In one embodiment, this indication includes an expiration time after which it is no longer valid. In another embodiment, the indication may include a preference by the content provider as to what measures to take in response to the unwanted communication.

At step 604, a user 202 and/or device 204 associated with the unwanted communication is identified. By way of example, this identification may be performed by determining the internal IP address 218 associated with the current session and then determining a durable device identifier 220 currently associated with IP address 218; in another embodiment, the current session could be mapped directly to a user-name received at the time of sign-on. In a third embodiment, an identification of a responsible user 202 and/or device 204 is included when each request 426 is rewritten into request 432, which can be included in ARQ 434 by the content provider 410 for use by gateway 406 and abuse prevention component 408.

At step 606 the indication and identification are combined into a message 442 and forwarded to abuse prevention component 228. In one embodiment, any requested content returned by content provider 410 is further included in message 442. In another embodiment, any preference as to measures indicated by content provider 410 is also included.

At step 608, a reply from abuse prevention component 228 is received, containing instructions 444 for rewriting the indication into a form suitable for presentation to responsible user 202. These instruction may take a variety of forms; by way of example, a warning for the user might be inserted into the response, or the response code might be changed. In another embodiment, the instructions might be to make no change to the response before sending it to the user. In yet another embodiment, the requested content included with the ARQ 434 was forwarded to the abuse prevention component, and instructions 444 include a preconstructed response 454 to be forwarded to the user 202. for Instructions to send no response to the user at all also fall within the scope of the claims below.

A response 454 is then created according to instructions 444 at step 610. In one embodiment, the instructions in response to an abusive HTTP request might indicate that ARQ 434 should be removed and a warning should be inserted into the text of the requested content included with ARQ 434. The response would then be created by changing the HTTP response code from one indicating an abusive request to one indicating a successful request (i.e., "200 OK"), and changing the body element of the HTML page requested to include a prominent warning message at the top of the page. In another embodiment, the requested content could be removed and replaced by a conventional HTTP error message (e.g., "403 Forbidden"). Other rewriting strategies can be used without departing from the scope of the claims below.

The reply thus created is then forwarded to computing device 204 for display to user 202 at step 612. In one embodiment, no reply was sent to device 204 when the gateway received ARQ 434, and the TCP/IP connection was held open until instructions were received from abuse prevention component 228. The response to the user 454 is then inserted into the connection as if it were the actual reply received from content provider 410. In another example, the unwanted communication was sent via SMTP (i.e., "email") and thus the TCP/IP connection was already completed when ARQ 434 was received. Response to user 454 then takes the form of an email message sent to the responsible user, which will be received in the normal course of events. In a third embodiment, the response 454 is stored for transmission to device 204 and thence presentation to the user 202 the next time a request is made. Other methods of transmitting a warning message or block notification to the user are also within the scope of the claims below.

Figure 7:
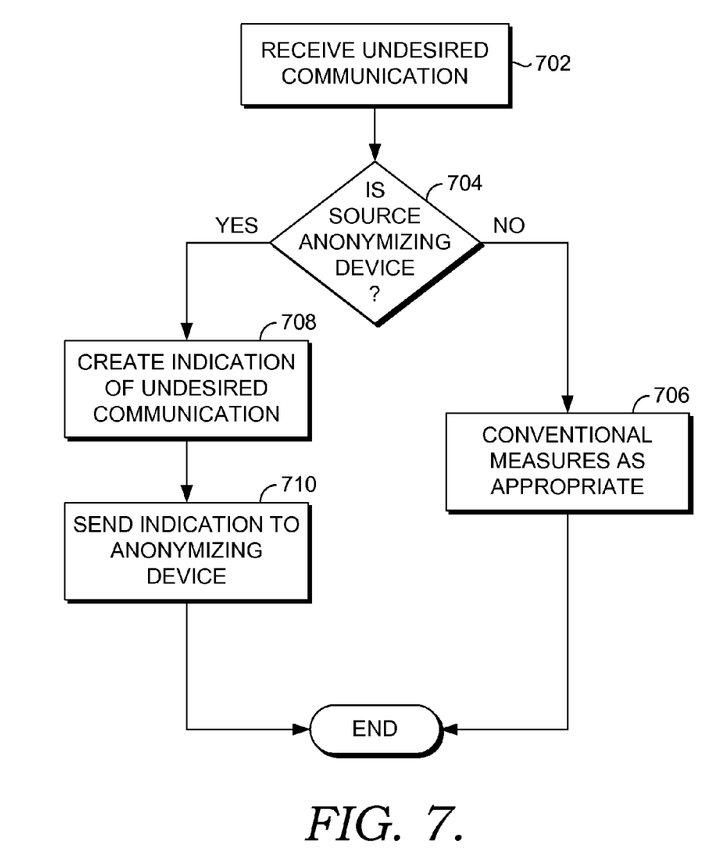
FIG. 7 depicts a flow diagram of an exemplary method operating at a content provider in accordance with one embodiment of the present invention.

FIG. 7 presents an illustrative method as a part of a system for preventing undesired data from being communicated through a network. As an illustrative example, this method could be implemented at a content provider or an Internet provider on the path of the unwanted communication. At step 702, an undesired communication 432 is received. In one embodiment, communication 432 is considered unwanted because it attempts to authorize a restricted resource without authorization. In another embodiment, the unwanted nature of the communication may be due to request frequency or size. In yet another embodiment, the nature of the content of the communication may be unwanted; for example, a comment posted to a web site which contained profanity or obscenity. Other reasons for considering a communication unwanted are within the scope of the claims below.

At step 704, a determination is made as to whether the apparent source of communication 432 is an anonymizing device such as gateway 230. In one embodiment, this determination may be made by comparing the source IP address 236 of the communication to a list of known IPs of anonymizing devices. In another embodiment, anonymizing device 232 inserts an indication that the communication was sent via anonymizing device 232 into the text of the rewritten request 432.

If the apparent source of the communication 432 is determined not to be an anonymizing device, conventional measures are taken as appropriate at step 706. By way of example, these measures may include blocking further communication originating from that IP address.

If the apparent source IP address does correspond to anonymizing device 230, an indication of unwanted communication (i.e., ARQ notification) 434 is created at step 708. In one embodiment, this ARQ is included with a conventional response to the unwanted communication. By way of example, this indication may be in the form of an HTTP response code included with a web page in response to communication 432. In another embodiment, ARQ 434 is an SMTP reply code sent in the normal course of communication with the intention of being intercepted by anonymizing device 232. In yet another embodiment, ARQ 434 is an out-of-band communication directly to anonymizing device 232.

At step 710, indication 434 is sent to anonymizing device 230, thereby enabling measures to be taken to prevent further undesired communications. In one embodiment, indication 434 includes an expiration time after which the indication time is no longer to be considered valid. This expiration time may be in the past to indicate that no measures beyond warning user 202 that the communication is unwanted, or it may be a special value to indicate that the indication should never expire. This expiration time may be determined based on factors including the type of unwanted communication, the number of previous unwanted communications from the same source, or the severity of the abusive behavior. Other factors may also be considered without departing from the scope of the claims below.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, facilitate a method of preventing undesired data from being communicated through a network, the method comprising:

receiving from an anonymizing device an indication of an undesired data communication that originated within an access network associated with the anonymizing device, and an identification of one or more of:

A) a computing device responsible for sending said communication from within the access network, or B) a user responsible for sending said communication from within the access network;

on the basis of specified criteria, determining whether said indication is valid;

when said indication is valid, incrementing a cumulative instance count that sums a number of instances associated with one or more of:

A) the computing device, and

B) the user; and when said cumulative count exceeds a predetermined threshold number of instances, implementing a measure to prevent a further undesired data communication from said computing device.

2. The computer-readable media of claim 1, wherein said receiving said indication includes receiving said indication from a content provider.

3. The computer-readable media of claim 2, wherein said indication includes a time at which the indication expires.

4. The computer-readable media of claim 3, wherein said specified criteria include one or more of the following, and wherein the indication is valid when a predetermined number of the following are satisfied:

(A) whether an agreement exists with said content provider to mitigate undesired communications;

(B) whether said expiration time has not yet passed;

(C) whether a count of indications previously received from said content provider is below a first predetermined threshold;

(D) whether a count of valid indications previously received identifying said user is above a second predetermined threshold; and (E) whether a count of valid indications previously received from said content provider identifying said user is above a third predetermined threshold.

5. The computer-readable media of claim 2, wherein said threshold is specific to the content provider from which it was received.

6. The computer-readable-media of claim 2, wherein said measure includes one or more of:

(A) providing a warning for the user that is to be presented via the computing device;

(B) temporarily blocking a data service from the computing device;

(C) temporarily blocking data any further communication to said content provider;

(D) permanently blocking a data service from the computing device; and (E) permanently blocking data any further communication to said content provider.

7. The computer-readable-media of claim 1, wherein implementing said measure includes implementing said measure for a plurality of computing devices known to be associated with said user.

8. One or more nontransitory computer-readable media having computer-executable instructions embodied thereon that, when executed, facilitate a of method of preventing undesired data from being communicated through a network, the method comprising:

at an anonymizing gateway associated with an access network, receiving from a content provider an indication that an unwanted data communication from the gateway has occurred;

determining an identification for one or more of

A) a computing device responsible for sending said communication from within the access network, or B) a user responsible for sending said communication from within the access network;

forwarding to a server responsible for collecting such indications the indication and the identification;

at the gateway, receiving from said server instructions for creating a response;

creating the response in accordance with the instructions; and forwarding the response to the computing device for display to the user.

9. The computer-readable media of claim 8, wherein said receiving the indication includes receiving data to be forwarded to said computing device for display to said user.

10. The computer-readable media of claim 9, wherein said receiving includes receiving via HTTP and said indication is an HTTP response code.

11. The computer-readable media of claim 8, wherein said indication includes an expiration time after which it is no longer valid.

12. The computer-readable media of claim 8, wherein said determining includes one or more of:

(A) mapping an application data stream associated with said content provider to an IP address assigned to the computing device;

(B) mapping an application data stream associated with said content provider to a unique identifier durably associated with the computing device; and (C) mapping an application data stream associated with said content provider to a session with an authenticated username associated with the user.

13. The computer-readable media of claim 8, wherein said instructions include one or more of:

(A) changing a response code to one which does not indicate that the communication is unwanted;

(B) inserting a warning into the response for display to the user;

(C) leaving the response unchanged; and (D) sending no response to the user.

14. One or more nontransitory computer-readable media having computer-executable instructions embodied thereon that, when executed, facilitate a of method of preventing undesired data from being communicated through a network, the method comprising:

receiving an undesired data communication;

determining whether a source Internet Protocol (IP) address associated with said communication is associated with an anonymizing device that obscures a source address of said originating device, wherein the source IP address associated with said communication does not uniquely identify an originating device responsible for said communication; and when the source IP address is associated with the anonymizing device, then A) creating a response to be sent to said anonymizing device, wherein said response includes an indication that said communication is undesired, and B) sending said response to said anonymizing device, thereby enabling a measure to be taken to prevent a further undesired data communication from said originating device.

15. The computer-readable media of claim 14, wherein said response includes an expiration time after which said indication is no longer valid.

16. The computer-readable media of claim 15, wherein said expiration time has already passed, thereby indicating that said measure should be limited to providing a warning to said originating device.

17. The computer-readable media of claim 15, further comprising:
 determining that a plurality of unwanted communications have been received from said originating device; and
 delaying the expiration time in proportion to a count of said communications.

18. The computer-readable media of claim 14, wherein said response includes data to be forwarded to said originating device.

19. The computer-readable media of claim 18, wherein said sending includes sending the data via HTTP and said indication is an HTTP response code.

20. The computer-readable media of claim 14, wherein said determining includes referencing a database containing IP addresses of known anonymizing devices.

\* \* \* \* \*